United States Patent Office 2,839,271
Patented June 17, 1958

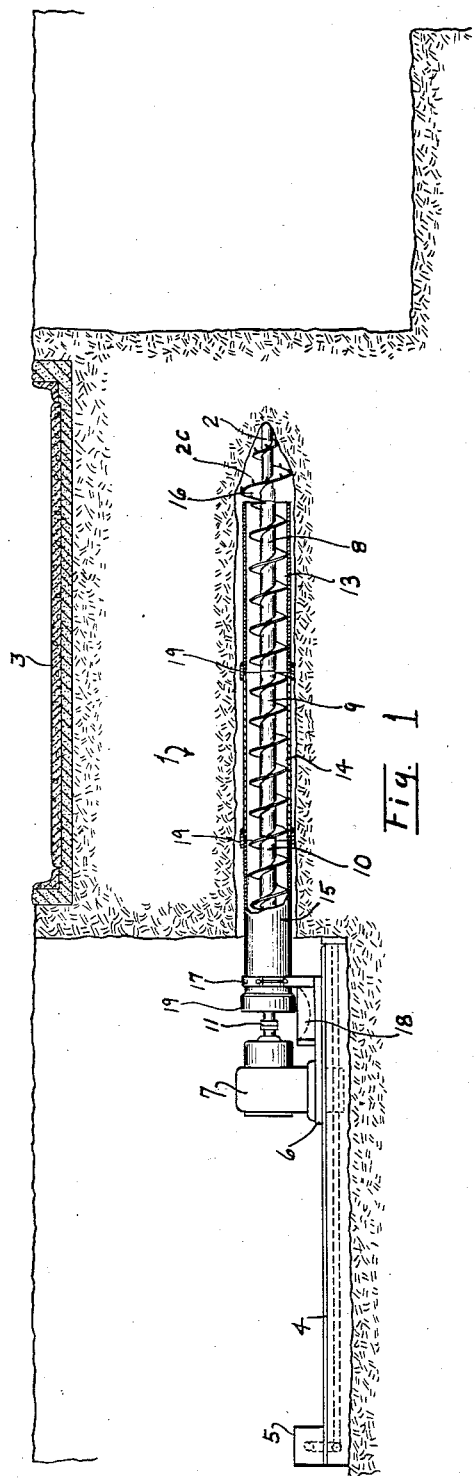
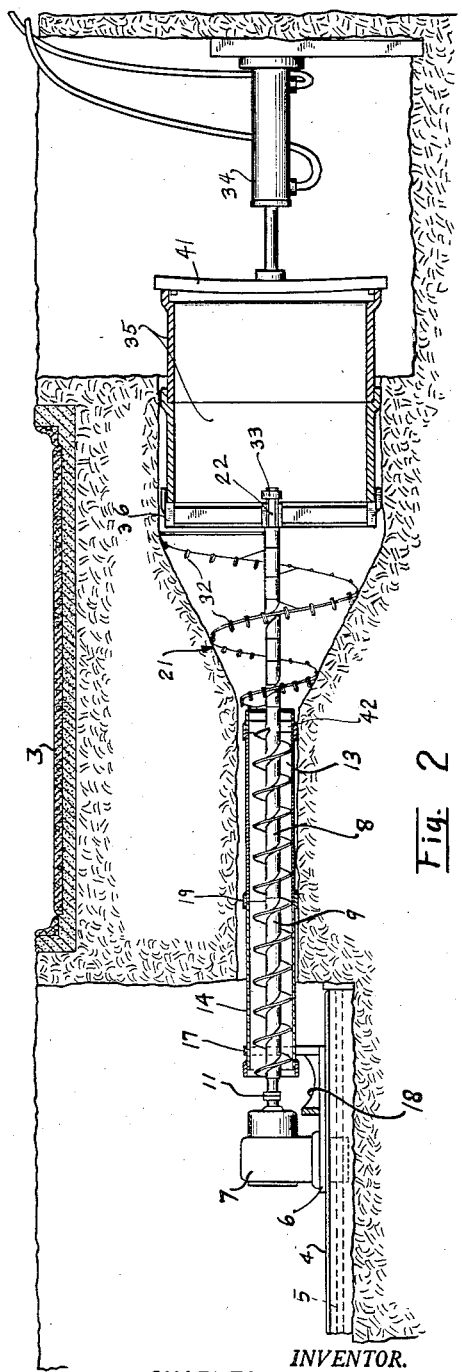
INVENTOR.
CHARLES W. KANDLE
BY Andrus & Sceales
Attorneys

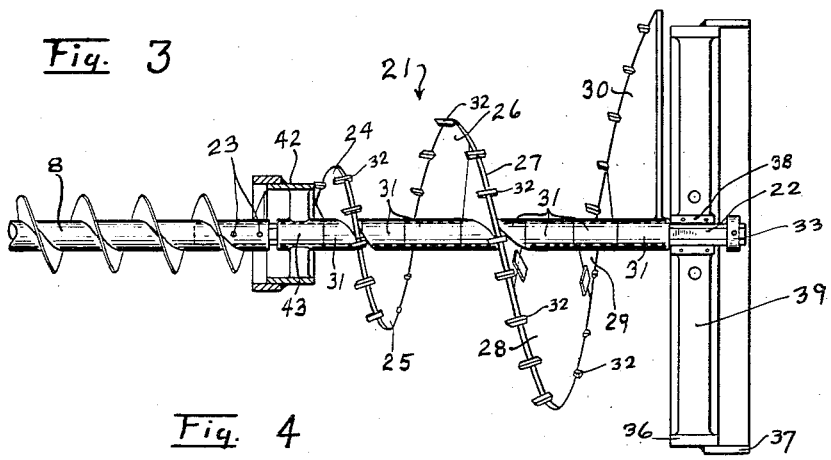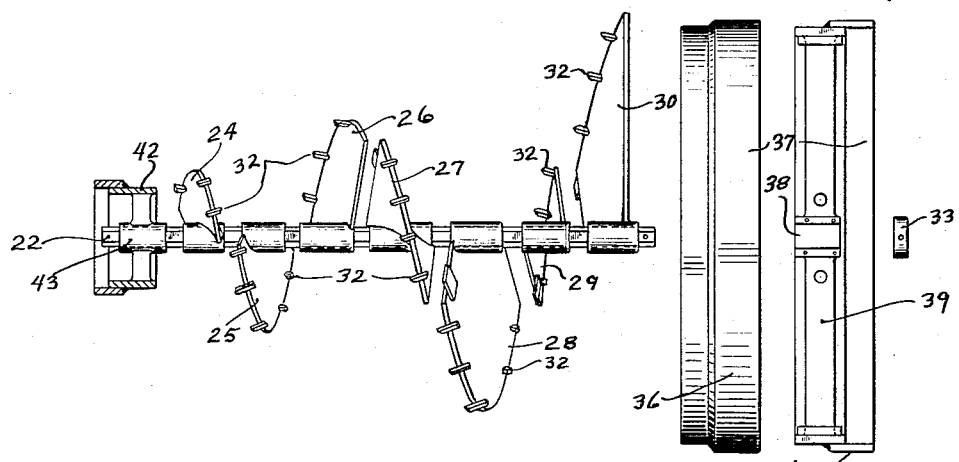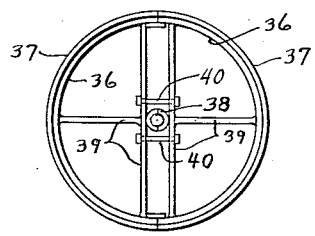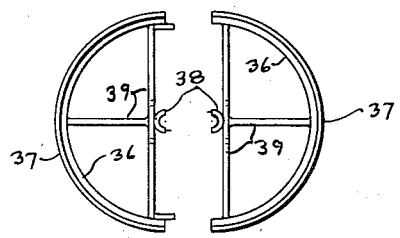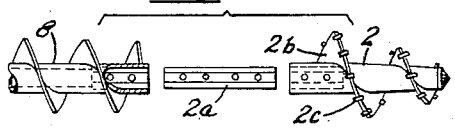

2,839,271

TUNNELING MACHINE

Charles W. Kandle, Chicago, Ill.

Application May 2, 1955, Serial No. 505,119

6 Claims. (Cl. 255—20)

This invention relates to machines for drilling relatively large bores in the earth such as beneath roadways and the like and particularly where limited space is available at one or both ends of the bore.

According to the invention, a first, relatively small cutting head is driven by a spiral conveyor turning in a casing and forms the initial bore. When the first cutting head reaches through from the end of the bore a second larger cutting head is substituted therefor and is either pulled or pushed back through the earth to enlarge the bore to the desired diameter. The second cutting head has a tapering spiral which pushes the earth towards its smaller end and into the casing in which the spoil is conveyed to the driven end of the spiral conveyor for discharge. The second cutting head is followed with the casing which is to be installed and which may be employed to push the second cutting head for feeding.

An object of the invention is to provide for the removal of the spoil ahead of the cutting head and to allow the regular installation of a casing therewith.

Another object is to provide equipment which requires a minimum amount of clearance at the ends of the bore.

Another object of the invention is to provide for cutting a relatively large bore which is protected at all times by casing.

Another object of the invention is to provide a tunneling machine capable of cutting a relatively large bore and which may be assembled and disassembled as required in a number of smaller units.

The drawings furnished herewith illustrate the best mode of carrying out the invention as presently contemplated and set forth hereinafter.

In the drawings:

Figure 1 is a vertical section taken through the earth and showing the drilling of the small bore with the first cutting head and as proceeding from a pit on one side of the roadway and underneath the roadway to the pit on the opposite side thereof;

Fig. 2 is a view similar to Figure 1 showing the installation of the casing from the pit on the right side of the roadway and following the second cutting head;

Fig. 3 is an enlarged view of the end of the spiral conveyor and the second cutting head for drilling the larger bore together with the guides fitting and adjacent ends of the large and small casings;

Fig. 4 is a view similar to Fig. 3 showing the parts of the second cutting head partially disassembled the smaller forward guide ring is broken away and sectioned and the separate parts comprising the larger rear guide ring are shown in elevation;

Fig. 5 is an end view of the larger guide as shown in Fig. 2;

Fig. 6 is a view showing the larger guide disassembled; and

Fig. 7 includes an enlarged sectional view of the end of a conveyor section and an elevational view of the first cutting head and a connector for joining the conveyor section and cutting head.

The drill 1 includes the head 2 for cutting an initial bore beneath the roadway 3 and the track 4 having power means 5 shown diagrammatically for moving the carriage 6 longitudinally on the track. The motor 7 mounted on carriage 6 drives the spiral conveyor sections 8, 9 and 10 which are progressively connected in series with the end section of the series connected by the coupling 11 to motor 7. The drill head 2 is connected to the other end of the series and is provided with the teeth 2c to cut an initial bore of a diameter large enough to receive the casings 13, 14 and 15 in which conveyor sections 8, 9 and 10 rotate. The spiral face 16 of drill head 2 is disposed to deliver the spoil into the forward end of casing 13.

Initially, the single conveyor section 8 within the corresponding casing 13 is used in starting the bore with casing 13 secured at one end to carriage 6 by the bracket member 17 and cutting head 2 fixed to section 8 forwardly of casing 13. Member 17 is fixed at its lower end to carraige 6 and is secured around casing 13 to hold the casing so that movement of the carriage on track 4 effects a corresponding movement of the casing. The driven end of cutting head 2 has an opening of hexagonal cross-section to receive one end of the hexagonal connector bar 2a which also fits a similiar opening in the end of conveyor section 8. The screw-like flange 2b of the head is similar to that of a screw pile. The cutting teeth 2c fixed to flange 2b and spaced along the periphery of the flange have their cutting ends toward the smaller forward end of the head. Each end of each conveyor section has an opening of hexagonal section to receive one end of connector 2a and is fitted with suitable pins which are adapted to pass through corresponding holes in the connector to secure adjacent sections to the connector or a connector to cutting head 2 as shown in Fig. 7. As the bore is cut to the depth allowed, conveyor sections are progressively added and secured by connectors 2a and the casings are progressively arranged end-to-end so that the movement of carriage 6 pushes cutting head 2 and casings 13, 14 and 15, etc. with the casings advancing immediately behind cutting head 2. The conveyor sections rotate within the casings to move the spoil toward the end of the casing secured by clamp 17 and the chute 18 is disposed on carriage 6 to divert the spoil to the side of track 4.

One corresponding end of each of casings 13, 14 and 15 is provided with the rim 19 to receive the corresponding other end of the adjacent casing and serves to maintain the casings in assembled relation for pushing in either direction as described.

When the bore is completed as at the right side of roadway 3, head 2 is removed for the assembly of the tapered spiral cutting head 21 on the hexagonal shaft 22 adapted to be fixed by pins 23 within the forward end of conveyor section 8. The cutting head 21 comprises the series of curved plates 24–30 which are individually provided with hubs 31 fitting shaft 22. Each hub 31 comprises a cylinder having an axial opening therethrough of hexagonal cross-section to receive and fit shaft 22 for rotation. Each plate is welded to a hub 31 and in plan view normal to the axis of its rotation is a sector having two straight edges which are radial to such axis but displaced in the direction of the axis. The outer edge of each plate is a spiral respecting said axis. The several plates 24–30 are dimensioned so that when arranged in order as with hubs 31 assembled on shaft 22 the straight edge of each plate matches and abuts the corresponding edge of the adjacent plate so that the outer edges of the several plates form a continuous spiral and the several plates form a screw or spiral flight. The plates are supported by hubs 31 on shaft 22 and are not necessarily connected to one another.

Plate 24 adjacent to the spoil intake end of casing 13 has a diameter corresponding to that of the casing and plate 30 has a diameter which provides the desired enlarged diameter of the bore. The cutting teeth 32 are recessed in the outer edges of plates 24–30 and are fixed to the plates as by welding or the like with their cutting ends toward the smaller end of head 21. The several cutting teeth are spaced along the spiral outer edges of the plates to cut a conical face as the plates rotate and the plates are pitched in the direction which moves the spoil toward casing 13. The same rotation of conveyor sections 8 and 9 as shown carries the spoil in casings 13 and 14 for discharge into chute 18. Fig. 2 shows conveyor section 10 and casing 15 removed in the course of enlarging the bore.

The several sections 24 through 30 of cutting head 21 should be capable of being assembled on shaft 22 without a derrick or other power lift and are secured by the collar 33 which is fixed to the end of the shaft.

When the cutting head 21 has been connected to conveyor 8, the power feed 5 is employed to pull the cutting head to enlarge the bore formed by head 2 and to pull the casings from the bore in advance of cutting head 21. The feed of head 21 may also be supplemented or provided instead by the cylinder 34 employed to install the pipe sections 35 providing the permanent protection of the enlarged bore.

The guide ring 36 disposed between cutting head 21 and collar 33 provides the bearing load on the cutting head 21 and includes the semi-circular ring-sections 37 having corresponding split bearing sections 38 and joined to form a rigid structure. The radial members 39 are joined by the bolts 40 with bearing sections 38 secured in assembled relation between the hub of plate 30 and collar 33 for free rotation on shaft 22. Ring sections 37 are dimensioned to receive the forward rim of the first pipe section 35. The cross-bar 41, applied to the opposite end of the pipe sections 35 as they are assembled, is disposed to receive the thrust from cylinder 34 and the force applied is effective to push the pipe sections and cutting head 21 as the latter is rotated by motor 7. Cylinder 34 is effective also to push the conveyor sections and motor 7 on track 4.

The guide ring 42 has a central bearing 43 mounted on shaft 22 between cutting head 21 and casing 13 and is open to allow the spoil to pass therethrough from the cutting head into the casing. Guide ring 42 fits the end of casing 13 and pushes the casings ahead of cutting head 21. The bearing 43 of guide ring 42 has an opening sufficient to allow shaft 22 to rotate therein without rotating the guide ring. The force applied to guide ring 36 by cylinder 34 is transferred by radial members 39 to bearing sections 38 which engage hub 31 of plate 30. Hubs 31 of plates 24–30 are in end-to-end contact and the hub of plate 24 engages bearing 43 of ring 42 to push the ring and the casings ahead of cutting head 21.

The enlarged bore may be of any desired size according to the number of curved plates 24–30 assembled on shaft 22 to comprise cutting head 21. That is, plates 24–29, 24–28, etc. will provide bores corresponding in size to the radius of the largest plate and according to the size of the completed bore desired.

Various modes of carrying out the invention are contemplated as within the scope of the following claims particularly pointing out and distinctly claiming the subject matter which is regarded as the invention.

I claim:

1. An earth drill for cutting a relatively large bore concentric with a previously drilled smaller bore to enlarge the same progressively from end to end, comprising a drive motor, a spiral conveyor connected at one end to said drive motor for rotation thereby and extending axially of said smaller bore, a non-rotary cylindrical casing in said bore and housing said conveyor with the end facing said motor constituting the discharge end for spoil and the opposite end constituting a spoil inlet for said conveyor, a cutting head detachably secured to said conveyor at the spoil inlet end thereof to rotate therewith, said head including a spiral flight of progressively increasing diameter from a lead end adjacent said conveyor to the outer end thereof with the flight winding spirally in the same direction as said spiral conveyor whereby when said conveyor and cutting head are driven as a unit the spoil from said cutting head is fed into the inlet for said conveyor and discharged from the opposite end of the casing by said conveyor, and means to feed said conveyor, casing and cutting head as a unit axially of said smaller bore to effect simultaneous drilling by said head and corresponding progressive withdrawal of said casing and spiral conveyor from said smaller bore.

2. An earth drill for cutting a relatively large bore concentric with a previously drilled smaller bore to enlarge the same progressively from end to end, comprising a drive motor, a spiral conveyor connected at one end to said drive motor for rotation thereby and extending axially of said smaller bore, a non-rotary cylindrical casing in said bore and housing said conveyor with the end facing said motor constituting the discharge end for spoil and the opposite end constituting a spoil inlet for said conveyor, a cutting head detachably secured to said conveyor at the spoil inlet end thereof to rotate therewith, said head including a spiral flight of progressively increasing diameter from a lead end adjacent said conveyor to the outer end thereof with the flight winding spirally in the same direction as said spiral conveyor whereby when said conveyor and cutting head are driven as a unit the spoil from said cutting head is fed into the inlet for said conveyor and discharged from the opposite end of the casing by said conveyor, means to feed said cutting head and conveyor axially of said smaller bore, and thrust means mounted between said rotating conveyor and cutting head to engage the end of said non-rotary casing to effect axial movement thereof with said cutting head as the latter is fed axially of said smaller bore, said means being open to provide for the free passage of spoil therethrough from said cutting head to said conveyor.

3. An earth drill for cutting a relatively large bore concentric with a previously drilled smaller bore to enlarge the same progressively from end to end, comprising a drive motor, a spiral conveyor connected at one end to said drive motor for rotation thereby and extending axially of said smaller bore, a non-rotary cylindrical casing in said bore and housing said conveyor with the end facing said motor constituting the discharge end for spoil and the opposite end constituting a spoil inlet for said conveyor, a cutting head detachably secured to said conveyor at the spoil inlet end thereof to rotate therewith, said head including a spiral flight of progressively increasing diameter from a lead end adjacent said conveyor to the outer end thereof with the flight winding spirally in the same direction as said spiral conveyor whereby when said conveyor and cutting head are driven as a unit the spoil from said cutting head is fed into the inlet for said conveyor and discharged from the opposite end of the casing by said conveyor, means to feed a sealing pipe into said enlarged bore following the drilling thereof by said cutting head, and thrust means between the inner end of the pipe and said rotating cutting head to push the latter in a feeding direction, said cutting head, conveyor and casing moving axially as a unit during the progressive drilling operation.

4. An earth drill for cutting a relatively large bore concentric with a previously drilled smaller bore to enlarge the same progressively from end to end, comprising a drive motor, a spiral conveyor connected at one end to said drive motor for rotation thereby and extending axially of said smaller bore, a non-rotary cylindrical casing in said bore and housing said conveyor with the end facing said motor constituting the discharge end for spoil and the opposite end constituting a spoil inlet for said conveyor, a cutting head detachably secured to said conveyor at the spoil inlet end thereof to rotate therewith, said head including a spiral flight of progressively increasing diameter from a lead end adjacent said conveyor to the outer end thereof with the flight winding spirally in the same direction as said spiral conveyor whereby when said conveyor and cutting head are driven as a unit the spoil from said cutting head is fed into the inlet for said conveyor and discharged from the opposite end of the casing by said conveyor, means to feed a sealing pipe into said enlarged bore following the drilling thereof by said cutting head, thrust means between the inner end of the pipe and said rotating cutting head to push the latter in a feeding direction, and thrust means mounted between said conveyor and said cutting head and engaging the end of said casing to effect axial movement of the latter with said cutting head.

5. A tapered spiral cutting head for a drill comprising, a non-circular shaft adapted to be rotatably driven, a plurality of spiral segment plates mounted on said shaft in axial alignment and complementary to one another so as to form a cutting head having a continuous spiral of progressively increasing diameter, said head having a feed lead in a direction toward its smaller diameter end.

6. A tapered spiral cutting head for a drill comprising, a non-circular shaft adapted to be rotatably driven, a plurality of hubs slidably mounted on said shaft for rotation therewith, a spiral segment plate secured on each of said hubs in and complementary to one another so as to form a cutting head having a continuous spiral of progressively increasing diameter, said head having a feed lead in a direction toward its smaller diameter end.

References Cited in the file of this patent

UNITED STATES PATENTS

| | | |
|---|---|---|
| 2,165,666 | Tilly | July 11, 1939 |
| 2,211,223 | Woods | Aug. 13, 1940 |
| 2,325,565 | Williams | July 27, 1943 |
| 2,684,834 | Miller et al. | July 27, 1954 |
| 2,775,439 | McCarthy | Dec. 25, 1956 |